(12) United States Patent
Erbes et al.

(10) Patent No.: US 9,828,472 B2
(45) Date of Patent: Nov. 28, 2017

(54) DIVISION OF A POLYARYLENE ETHER SOLUTION

(71) Applicant: BASF SE, Ludwigshafen (DE)

(72) Inventors: Joerg Erbes, Karlsruhe (DE); Gerhard Lange, Schriesheim (DE); Tobias Kortekamp, Mannheim (DE); Cecile Schneider, Frankenthal (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/904,491

(22) PCT Filed: Jul. 16, 2014

(86) PCT No.: PCT/EP2014/065241
§ 371 (c)(1),
(2) Date: Jan. 12, 2016

(87) PCT Pub. No.: WO2015/007775
PCT Pub. Date: Jan. 22, 2015

(65) Prior Publication Data
US 2016/0208056 A1    Jul. 21, 2016

(30) Foreign Application Priority Data

Jul. 18, 2013  (EP) .................................. 13176988

(51) Int. Cl.
| | |
|---|---|
| C08G 75/00 | (2006.01) |
| C08J 3/14 | (2006.01) |
| C08J 3/12 | (2006.01) |
| C08G 65/46 | (2006.01) |
| C08G 75/23 | (2006.01) |

(52) U.S. Cl.
CPC ............... *C08J 3/14* (2013.01); *C08G 65/46* (2013.01); *C08G 75/23* (2013.01); *C08J 3/12* (2013.01); *C08J 2381/06* (2013.01)

(58) Field of Classification Search
CPC   C08G 75/23; C08G 75/20; C08G 2261/3444; C08L 81/06
See application file for complete search history.

(56) References Cited

U.S. PATENT DOCUMENTS

| | | | |
|---|---|---|---|
| 3,923,738 A | 12/1975 | Van Sorge | |
| 5,013,816 A | 5/1991 | Bobbink et al. | |
| 2008/0085990 A1* | 4/2008 | Richter ................. | C08G 65/46 528/126 |
| 2011/0070442 A1 | 3/2011 | Asano et al. | |
| 2011/0311816 A1 | 12/2011 | Kanomata et al. | |
| 2013/0337263 A1 | 12/2013 | Asano et al. | |
| 2014/0183028 A1 | 7/2014 | Sigwart et al. | |
| 2014/0183029 A1 | 7/2014 | Erbes et al. | |
| 2014/0183030 A1 | 7/2014 | Sigwart et al. | |
| 2014/0183031 A1 | 7/2014 | Sigwart et al. | |
| 2014/0183032 A1 | 7/2014 | Sigwart et al. | |
| 2014/0187737 A1 | 7/2014 | Erbes et al. | |
| 2014/0187796 A1 | 7/2014 | Sigwart et al. | |
| 2014/0225026 A1 | 8/2014 | Park et al. | |

FOREIGN PATENT DOCUMENTS

| | | |
|---|---|---|
| CA | 2152279 A1 | 7/1994 |
| DE | 36 44 464 A1 | 7/1988 |
| EP | 2 189 487 A1 | 5/2010 |
| EP | 2 287 236 A1 | 2/2011 |
| EP | 2 305 740 A1 | 4/2011 |
| WO | WO 94/15999 A1 | 7/1994 |

OTHER PUBLICATIONS

International Search Report dated Oct. 17, 2014 in PCT/EP2014/065241.
International Preliminary Report on Patentability dated Sep. 23, 2015 in PCT/EP2014/065241 (with English language translation).
Hans R. Kricheldorf, "Aromatic Polyethers" Handbook of Polymer Synthesis, XP009154507, 2005, pp. 427-501.
Encyclopedia of Polymer Science and Technology, vol. 4, XP009154506, 2003, pp. 2-8.
U.S. Appl. No. 14/900,328, filed Dec. 21, 2015, Weber et al.
U.S. Appl. No. 14/888,570, filed Nov. 2, 2015, Weber et al.
U.S. Appl. No. 14/904,614, filed Jan. 12, 2016, Erbes et al.
U.S. Appl. No. 14/904,610, filed Jan. 12, 2016, Erbes et al.
U.S. Appl. No. 14/917,488, filed Mar. 8, 2016, Weber et al.

\* cited by examiner

*Primary Examiner* — Shane Fang
(74) *Attorney, Agent, or Firm* — Oblon, McClelland, Maier & Neustadt, L.L.P.

(57) ABSTRACT

Process for producing polyarylene ether beads from a polyarylene ether solution, comprising the steps of
  i) dividing the polyarylene ether solution into droplets,
  ii) transferring the droplets into a precipitation bath to form polyarylene ether beads in the precipitation bath which
  (A) comprises at least one aprotic solvent (component (1)) and at least one protic solvent (component (2)),
  (B) has a temperature of 0° C. to $T_c$, where the critical temperature $T_c$ in [° C.] can be determined by the numerical equation $T_c=(77-c)/0.58$ in which c is the concentration of component (1) in the precipitation bath in [% by weight] and
  (C) has component (1) in concentrations of 5% by weight to $c_c$, where the critical concentration $c_c$ in [% by weight] can be determined by the numerical equation $c_c=77-0.58*T$ in which T is the temperature in the precipitation bath in [° C.], where
the percentages by weight are each based on the sum of the percentages by weight of component (1) and of component (2) in the precipitation bath.

15 Claims, No Drawings

DIVISION OF A POLYARYLENE ETHER SOLUTION

The invention relates to a process for producing polyarylene ether beads from a polyarylene ether solution, comprising the steps of
i) dividing the polyarylene ether solution into droplets,
ii) transferring the droplets into a precipitation bath to form polyarylene ether beads in the precipitation bath which
(A) comprises at least one aprotic solvent (component (1)) and at least one protic solvent (component (2)),
(B) has a temperature of 0° C. to $T_c$, where the critical temperature $T_c$ in [° C.] can be determined by the numerical equation $T_c=(77-c)/0.58$ in which c is the concentration of component (1) in the precipitation bath in [% by weight] and
(C) has component (1) in concentrations of 5% by weight to $c_c$, where the critical concentration $c_c$ in [% by weight] can be determined by the numerical equation $c_c=77-0.58*T$ in which T is the temperature in the precipitation bath in [° C.], where
the percentages by weight are each based on the sum of the percentages by weight of component (1) and of component (2) in the precipitation bath.

The present invention also relates to the polyarylene ether beads from the process and to the use thereof for production of polyarylene ether products.

In the production of polymers, the polymers are frequently obtained in the form of polymer solutions. These polymer solutions can arise directly in the course of production of the polymers, for example in the polycondensation of monomers in a solvent (solution polymerization). In the case of polycondensation of monomers in the absence of a solvent too (bulk polymerization), the polymers obtained are frequently dissolved in a solvent for further workup.

For conversion of the polymers present in the polymer solution to the pure, solid state, various processes have been described in the prior art. A standard process here is the introduction of the polymer solution into a further solvent in which the polymer is insoluble. The further solvent in which the polymer is insoluble is generally also referred to as the precipitation bath.

For production of polymer beads, the prior art additionally describes processes in which the polymer solution is divided into droplets, from which the polymer beads are subsequently obtained in the precipitation bath. In the processes described in the prior art, the precipitation bath must consist principally of the further solvent in which the polymer is insoluble. The proportion of the solvent in which the polymer is soluble in the precipitation bath is kept to a minimum. This is necessary in order to reliably assure the precipitation. In order to minimize the proportion of the solvent in which the polymer is soluble in the precipitation bath, generally small volumes of the polymer solution are added dropwise to large volumes of the precipitation bath, or the precipitation bath is exchanged continuously and replaced with fresh precipitation bath.

Processes for producing polymer beads are described, for example, in DE 3 644 464 and EP 2 305740. DE 3 644 464 describes a process for producing polyaryl ether sulfone beads, in which a solution comprising a polyaryl ether sulfone and N-methylpyrrolidone is added dropwise to a precipitation bath consisting of water. EP 2 305740 also describes a process for producing polymer beads, in which pure water is used as the precipitation bath. The water used as the precipitation bath is exchanged constantly in order to minimize the concentration of N-methylpyrrolidone and to transport the polymer beads formed onward to downstream process stages.

In the processes described in the prior art for producing polymer beads, there was still room for improvement. The polymer beads obtained by the processes described in the prior art tend to agglomerate. Furthermore, the sphericity properties are not always satisfactory. The processes described in the prior art additionally give rise to relatively large amounts of what are called fines. These are polymer beads which are of small particle size and which lead to problems in the further workup or processing of the polymer beads.

The problem addressed by the present invention was that of developing a process in which polyarylene ether beads are provided, which do not agglomerate in the precipitation bath and thus can be processed further without further workup steps. In order that polyarylene ether beads have good further processability, they should have maximum roundness, i.e. have a sphericity value greater than 0.5. More particularly, the beads obtained in this way should have a shape in which possible contaminants of the polyarylene ether beads can be readily extracted. Moreover, the process should run reliably. The polyarylene ether beads should additionally have smaller amounts of fines than polyarylene ether beads obtainable by the processes from the prior art. The polyarylene ether beads should have good processability and further processability.

The problem addressed by the invention is solved by the process described at the outset.

It has been found that, surprisingly, it is advantageous for production of polyarylene ether beads to use precipitation baths comprising relatively large amounts of at least one aprotic solvent. Contrary to the prejudice described in the prior art that the precipitation bath used is to comprise a minimum level of solvent in which the polymer has good solubility, it has been found that concentrations of at least 5% by weight, preferably at least 8% by weight, more preferably at least 12% by weight, of at least one aprotic solvent (component (1)) in the precipitation bath can prevent or at least reduce the formation of the unwanted fines.

It is suspected that the presence of an aprotic solvent lowers the surface tension of the precipitation bath, which reduces the formation of fines.

"Fines" in the context of the present invention are understood to mean polyarylene ether beads having a particle size of ≤1000 μm (less than/equal to 1000 μm). The particle size is determined here by means of sieve analysis. The polyarylene ether beads dried at 60° C. are analyzed.

The process according to the invention provides polyarylene ether beads having a reduced fines content.

In one embodiment of the process according to the invention, a precipitation bath not comprising any aprotic solvent is used at the start of the process. In this embodiment, the concentration of component (1) at the start is 0% by weight. The inventive concentration of at least 5% by weight, preferably at least 10% by weight, of component (1) is established in this embodiment by the dropwise addition of the polymer solution to the precipitation bath. In a further embodiment of the process according to the invention, the concentration of component (1) in the precipitation bath even at the start of the process is at least 5% by weight, preferably at least 8% by weight, more preferably at least 12% by weight. This embodiment is preferred.

The lower limit of the concentration of component (1) in the precipitation bath is thus at least 5% by weight, preferably at least 8% by weight and more preferably at least 12% by weight. The percentages by weight are each based on the sum of the percentages by weight of component (1) and of component (2) in the precipitation bath.

The upper limit of the concentration of component (1) in the precipitation bath is temperature-dependent. It is also referred to as the critical concentration $c_c$. The unit of $c_c$ is [% by weight].

The critical concentration $c_c$ in [% by weight] can be determined by the numerical equation $$c_c = 77 - 0.58 * T.$$

T therein is the temperature of the precipitation bath in [° C.]. T thus indicates the actual temperature of the precipitation bath. Proceeding from the actual temperature of the precipitation bath, it is possible to calculate the critical concentration $c_c$ in % by weight. The percentages by weight are based on the sum of components (1) and (2) in the precipitation bath.

Within the inventive concentration range from 5% by weight to $c_c$, the formation of fines and the agglomeration of the polyarylene ether beads are very substantially prevented.

Polyarylene ethers are known to the person skilled in the art as a polymer class. In principle, all polyarylene ethers known to those skilled in the art and/or preparable by known methods are options. Corresponding methods are explained below.

Preferred polyarylene ethers are formed from units of the general formula I:

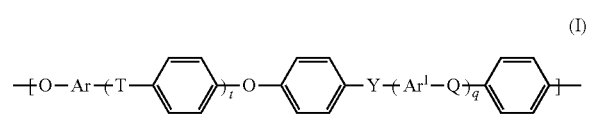

where the symbols t, q, Q, T, Y, Ar and $Ar^1$ are defined as follows:

t, q: each independently 0, 1, 2 or 3,

Q, T, Y: each independently a chemical bond or group selected from —O—, —S—, —SO$_2$—, S=O, C=O, —N=N— and —CR$^a$R$^b$— where R$^a$ and R$^b$ are each independently a hydrogen atom or a $C_1$-$C_{12}$-alkyl, $C_1$-$C_{12}$-alkoxy or $C_6$-$C_{18}$-aryl group, and where at least one of Q, T and Y is —SO$_2$— and Ar, $Ar^1$: each independently an arylene group having from 6 to 18 carbon atoms.

If Q, T or Y, among the abovementioned conditions, is a chemical bond, this is understood to mean that the adjacent group to the left and the adjacent group to the right are bonded directly to one another via a chemical bond.

Preferably, however, Q, T and Y in formula I are each independently selected from —O— and —SO$_2$—, with the proviso that at least one of the group consisting of Q, T and Y is —SO$_2$—.

If Q, T or Y is —CR$^a$R$^b$—, R$^a$ and R$^b$ are each independently a hydrogen atom or a $C_1$-$C_{12}$-alkyl, $C_1$-$C_{12}$-alkoxy or $C_6$-$C_{18}$-aryl group.

Preferred $C_1$-$C_{12}$-alkyl groups comprise linear and branched, saturated alkyl groups having from 1 to 12 carbon atoms. Particular mention should be made of the following radicals: $C_1$-$C_6$-alkyl radical such as methyl, ethyl, n-propyl, i-propyl, n-butyl, sec-butyl, 2- or 3-methylpentyl and longer-chain radicals such as unbranched heptyl, octyl, nonyl, decyl, undecyl, lauryl and the singly or multiply branched analogs thereof.

Useful alkyl radicals in the aforementioned usable $C_1$-$C_{12}$-alkoxy groups include the alkyl groups having from 1 to 12 carbon atoms defined above. Cycloalkyl radicals usable with preference comprise especially $C_3$-$C_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and $Ar^1$ are each independently a $C_6$-$C_{18}$-arylene group. Proceeding from the starting materials described below, Ar is preferably derived from an electron-rich aromatic substance subject to easy electrophilic attack, preferably selected from the group consisting of hydroquinone, resorcinol, dihydroxynaphthalene, especially 2,7-dihydroxynaphthalene, and 4,4'-bisphenol. Preferably, $Ar^1$ is an unsubstituted $C_6$- or $C_{12}$-arylene group.

Useful $C_6$-$C_{18}$-arylene groups Ar and $Ar^1$ especially include phenylene groups such as 1,2-, 1,3- and 1,4-phenylene, naphthylene groups, for example 1,6-, 1,7-, 2,6- and 2,7-naphthylene, and the arylene groups derived from anthracene, phenanthrene and naphthacene.

Preferably, Ar and $Ar^1$ in the preferred embodiment of formula I are each independently selected from the group consisting of 1,4-phenylene, 1,3-phenylene, naphthylene, especially 2,7-di hydroxynaphthylene, and 4,4'-bisphenylene.

Preferred polyarylene ethers are those comprising at least one of the following units Ia to Io as repeat structural units:

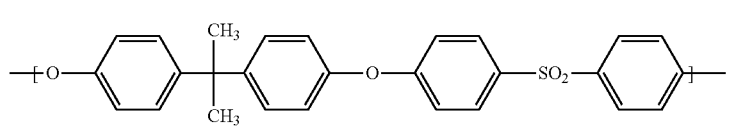

Ia

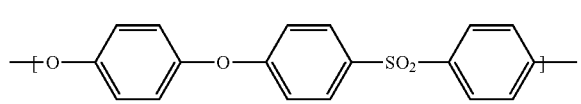

Ib

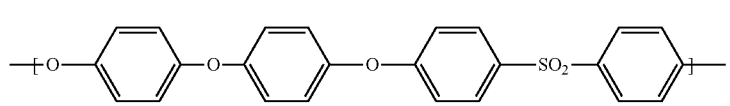

Ic

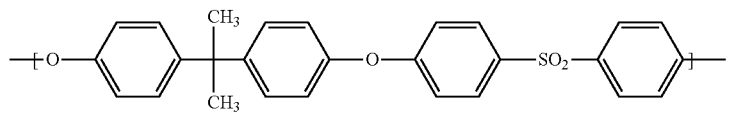
Id
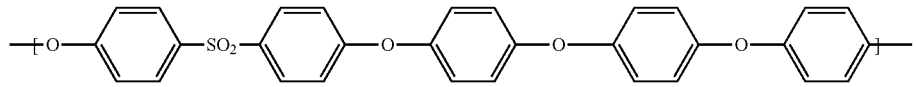
Ie
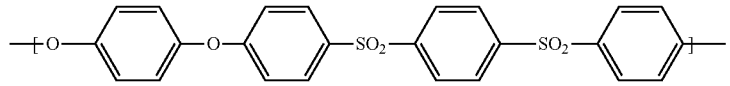
If
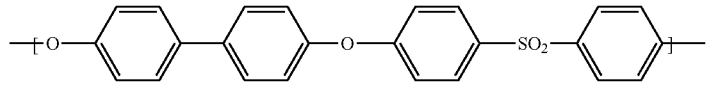
Ig
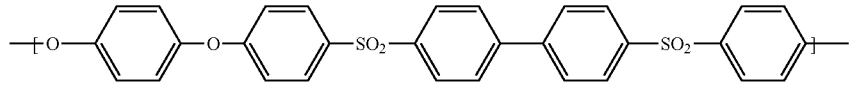
Ih
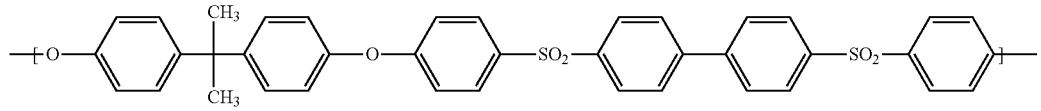
Ii
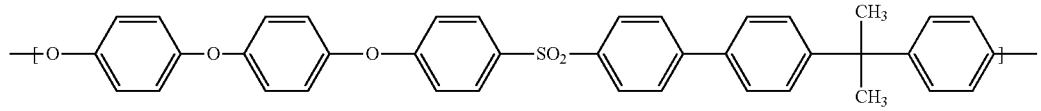
Ij
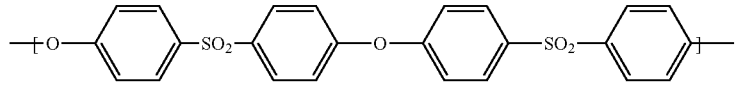
Ik
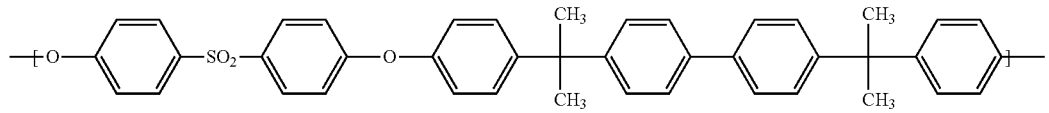
Il
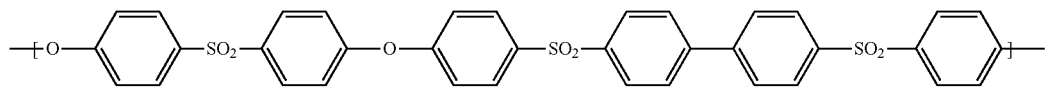
Im
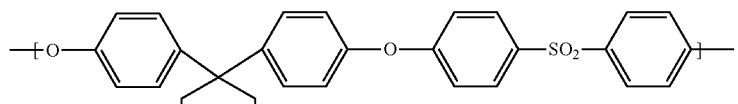
In
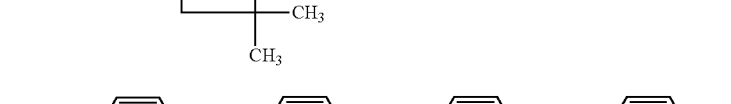
Io
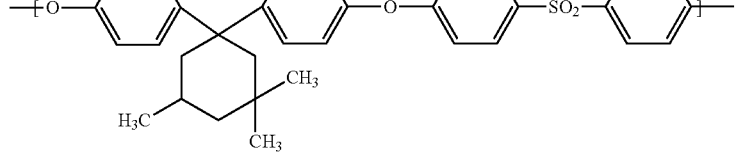
In addition to the preferred units Ia to Io, preference is also given to those units in which one or more 1,4-phenylene units which originate from hydroquinone are replaced by 1,3-phenylene units which originate from resorcinol or by naphthylene units which originate from dihydroxynaphthalene.

Particularly preferred units of the general formula I are the units Ia, Ig and Ik. It is also particularly preferred when the polyarylene ethers of component (A) are formed essentially from one kind of units of the general formula I, especially from a unit selected from Ia, Ig and Ik.

In a particularly preferred embodiment, Ar=1,4-phenylene, t=1, q=0, T is a chemical bond and Y=$SO_2$. Particularly preferred polyarylene ether sulfones (A) formed from the aforementioned repeat unit are referred to as polyphenylene sulfone (PPSU) (formula Ig).

In a further particularly preferred embodiment, Ar=1,4-phenylene, t=1, q=0, T=$C(CH_3)_2$ and Y=$SO_2$. Particularly preferred polyarylene ether sulfones (A) formed from the aforementioned repeat unit are referred to as polysulfone (PSU) (formula Ia).

In a further particularly preferred embodiment, Ar=1,4-phenylene, t=1, q=0, T=Y=$SO_2$. Particularly preferred polyarylene ether sulfones formed from the aforementioned repeat unit are referred to as polyether sulfone (PESU) (formula Ik).

Abbreviations such as PPSU, PESU and PSU in the context of the present invention conform to DIN EN ISO 1043-1 (Plastics—Symbols and abbreviated terms—Part 1: Basic polymers and their special characteristics (ISO 1043-1:2001); German version EN ISO 1043-1:2002).

The polyarylene ethers preferably have weight-average molecular weights $M_w$ of 10 000 to 150 000 g/mol, especially of 15 000 to 120 000 g/mol, more preferably of 18 000 to 100 000 g/mol, determined by means of gel permeation chromatography in a dimethylacetamide solvent against narrow-distribution polymethylmethacrylate as standard.

In addition, the polyarylene ethers preferably have an apparent melt viscosity at 350° C./1150 $s^{-1}$ of 150 to 300 Pa s, preferably of 150 to 275 Pa s.

The flowability was assessed using the melt viscosity. The melt viscosity was determined by means of a capillary rheometer. The apparent viscosity was determined at 350° C. as a function of the shear rate in a capillary viscometer (Göttfert Rheograph 2003 capillary viscometer) with a circular capillary of length 30 mm, a radius of 0.5 mm, a die inlet angle of 180°, a diameter of the reservoir vessel for the melt of 12 mm and with a preheating time of 5 minutes. The values reported are those determined at 1150 $s^{-1}$.

Preparation processes which lead to the aforementioned polyarylene ethers are known per se to those skilled in the art and are described, for example, in Herman F. Mark, "Encyclopedia of Polymer Science and Technology", third edition, Volume 4, 2003, "Polysulfones" chapter on pages 2 to 8, and in Hans R. Kricheldorf, "Aromatic Polyethers" in: Handbook of Polymer Synthesis, second edition, 2005, on pages 427 to 443.

Particular preference is given to the reaction of at least one aromatic compound having two halogen substituents and at least one aromatic compound having two functional groups reactive toward the aforementioned halogen substituents in aprotic polar solvents in the presence of anhydrous alkali metal carbonate, especially sodium, potassium or calcium carbonate or mixtures thereof, very particular preference being given to potassium carbonate. A particularly suitable combination is N-methylpyrrolidone as solvent and potassium carbonate as base.

Preferably, the polyarylene ethers have either halogen end groups, especially chlorine end groups, or etherified end groups, especially alkyl ether end groups, which are obtainable by reaction of the OH or phenoxide end groups with suitable etherifying agents.

Suitable etherifying agents are, for example, monofunctional alkyl or aryl halide, for example $C_1$-$C_6$-alkyl chloride, bromide or iodide, preferably methyl chloride, or benzyl chloride, bromide or iodide, or mixtures thereof. Preferred end groups in the context of the polyarylene ethers of the component are halogen, especially chlorine, alkoxy, especially methoxy, aryloxy, especially phenoxy, or benzyloxy.

A polyarylene ether solution is understood to mean a solution which may comprise one or more solvents, one or more polyarylene ethers. The polyarylene ether solution may additionally comprise materials which stem from the preparation process. These include impurities, and also starting materials. More particularly, the polyarylene ether solution may also comprise monomers and salts from the preparation process for the polyarylene ethers, such as sodium carbonate, potassium carbonate, potassium chloride or sodium chloride. By-products and/or decomposition products may also be present in the polyarylene ether solution.

The solvents used for the polyarylene ether solution may be one or more aprotic solvents. An aprotic solvent is understood to mean a solvent which does not have a functional group from which one or more hydrogen atoms in the solvent molecule can be eliminated as a proton. More particularly, it is possible to use N-methyl-2-pyrrolidone (NMP) and/or N-ethyl-2-pyrrolidone (NEP).

In one embodiment of the present invention, the polyarylene ether solution comprises the same aprotic solvent as the precipitation bath. The present invention thus also provides a process in which the polyarylene ether solution and the precipitation bath comprise the same aprotic solvent. In a preferred embodiment, both the polyarylene ether solution and the precipitation bath comprise N-methyl-2-pyrrolidone (NMP) and/or N-ethyl-2-pyrrolidone (NEP).

The polyarylene ether solution preferably has a concentration of 5 to 50% by weight of polyarylene ether in aprotic solvent, where the percentages by weight are based on the sum of the percentages by weight of the polyarylene ether and the aprotic solvent. More particularly, the polyarylene ether solution may have a concentration of 5 to 40% by weight, preferably of 5 to 35% by weight, more preferably of 5 to 34% by weight, for example of 6 to 30% by weight, of polyarylene ether in aprotic solvent, where the percentages by weight are based on the sum of the percentages by weight of the polyarylene ether and the aprotic solvent.

The polyarylene ether solution may have a viscosity of 0.05 to 1.30 Pa s, the viscosity being measured in a shear stress-controlled rotary viscometer, for example having a Couette geometry (DIN 53019-1), at the temperature at which the division is performed, and at a shear rate of $10^{-1}$ $s^{-1}$.

The polyarylene ether solution in the division step may have a temperature of 15 to 250° C., especially of 20 to 120° C., for example of 20 to 110° C., the temperature being measurable with the aid of a thermometer, for example with a PT100 resistance thermometer, on the division apparatus from which the polyarylene ether solution is supplied to the division apparatus for performance of the division.

In the process for producing polyarylene ether beads from a polyarylene ether solution, a polyarylene ether solution passes through a division step for formation of droplets. It is possible here to use different kinds of division apparatus. The polymer solution can, for example, be sprayed or dropletized.

If the polymer solution is sprayed, the division apparatus used may comprise one-phase, two-phase or multiphase nozzles. Two-phase or multiphase nozzles can be employed especially when the polyarylene ether solution is to be contacted with the precipitation solution actually before it hits the precipitation solution in the precipitation bath.

More particularly, it is possible to select spray nozzles which achieve beads of maximum size. To achieve beads of relatively large size, it is possible to use spring cone nozzles, i.e. pressure nozzles which are actuated by a spring. To achieve beads of minimum size, it is possible to use hollow cone nozzles.

If the polyarylene ether solution is divided, one option is to use one or more die plates as division apparatuses. A die plate is understood to mean a plate of metal, glass or plastic having holes which divide the polyarylene ether solution.

The diameter of a hole of the die plate may be from 0.1 to 5.0 mm. More particularly, the diameter of the die plate may be from 0.5 to 4.0 mm. Preferably, the diameter of the die plate is 0.5 to 2.5 mm, especially from 0.5 to 2.0 mm.

It is also possible to use one or more capillaries as the division apparatus for dropletization of the polyarylene ether solution. A capillary is understood to mean an elongate cavity surrounded by a boundary which may be made from metal, glass and/or plastic.

The internal diameter of a capillary may be from 0.1 to 5.0 mm. More particularly, the internal diameter of the capillary may be from 0.5 to 4.0 mm. Preferably, the diameter of the capillary may be 0.5 to 2.5 mm, especially from 0.5 to 2.0 mm.

In one embodiment with regard to the division process, the polyarylene ether solution is divided at elevated pressure. In one variant, the polyarylene ether solution is divided at a gauge pressure of 0.1 to 50 bar, especially of 1 to 40 bar, preferably of 1 to 10 bar, more preferably of 1 to 9 bar. The pressure is measured between the division apparatus and the reservoir vessel which comprises the polyarylene ether solution to be divided, with the aid of a pressure gauge (for example, a spiral spring pressure gauge may be suitable).

The precipitation bath comprises one or more aprotic solvents as component (1). An aprotic solvent is understood to mean a solvent which does not have a functional group from which one or more hydrogen atoms in the solvent molecule can be eliminated as a proton. More particularly, it is possible to use N-methyl-2-pyrrolidone (NMP) and/or N-ethyl-2-pyrrolidone (NEP).

The precipitation bath furthermore comprises one or more protic solvents as component (2).

The precipitation bath may comprise water and/or at least one alcohol as component (2). The water used may be mineralized or demineralized water. The alcohol used may be mono- and/or dihydric alcohols. Preference is given to using monohydric alcohols. The monohydric alcohols used may especially be methanol, ethanol, 1-propanol and/or 2-propanol.

The precipitation bath preferably comprises a mixture of an aprotic solvent as component (1) and water and/or at least one alcohol as component (2).

The precipitation bath preferably comprises a mixture of from 5% by weight to cc of an aprotic solvent, where the percentages by weight are based on the sum of the percentages by weight of the aprotic solvent (component (1)) and of the water and/or alcohol (component (2)) and this sum adds up to 100% by weight.

More particularly, the precipitation bath comprises a mixture of from 8% by weight to cc of an aprotic solvent, where the percentages by weight are based on the sum of the percentages by weight of the aprotic solvent (component (1)) and of the water and/or alcohol (component (2)) and this sum adds up to 100% by weight.

More particularly, the precipitation bath comprises from 5 to 70% by weight of an aprotic solvent as component (1) and from 30 to 95% by weight of water and/or alcohol as component (2), where the sum of the percentages by weight of components (1) and (2) adds up to 100% by weight. More particularly, the precipitation bath comprises a mixture of from 8 to 70% by weight of an aprotic solvent as component (1) and from 30 to 92% by weight of water and/or alcohol as component (2), where the sum of the percentages by weight of components 1 and 2 adds up to 100% by weight.

More preferably, the precipitation bath comprises from 5 to 70% by weight of an aprotic solvent as component (1) and from 30 to 95% by weight of water as component (2), where the sum of the percentages by weight of components 1 and 2 adds up to 100% by weight. More particularly, the precipitation bath comprises a mixture of from 8 to 70% by weight of an aprotic solvent as component (1) and from 30 to 92% by weight of water and/or alcohol as component (2), where the sum of the percentages by weight of components 1 and 2 adds up to 100% by weight.

Most preferably, the precipitation bath comprises from 5 to 70% by weight of N-methyl-2-pyrrolidone (NMP) and/or N-ethyl-2-pyrrolidone (NEP) as component (1) and from 30 to 95% by weight of water as component (2), where the sum of the percentages by weight of components (1) and (2) adds up to 100% by weight. More particularly, the precipitation bath comprises a mixture of from 8 to 70% by weight of N-methyl-2-pyrrolidone (NMP) and/or N-ethyl-2-pyrrolidone (NEP) as component (1) and from 30 to 92% by weight of water as component (2), where the sum of the percentages by weight of components (1) and (2) adds up to 100% by weight.

In a further particularly preferred embodiment, the precipitation bath comprises 5 to 50% by weight, more preferably 8 to 50% by weight and especially preferably 12 to 50% by weight of component (1), where the percentages by weight are each based on the sum of the percentages by weight of component (1) and component (2) in the precipitation bath.

In a further particularly preferred embodiment, the precipitation bath comprises 5 to 70% by weight, more preferably 8 to 70% by weight and especially preferably 12 to 70% by weight of component (1), where the percentages by weight are each based on the sum of the percentages by weight of component (1) and component (2) in the precipitation bath.

As a lower limit, the precipitation bath generally has a temperature of at least 0° C., preferably of at least 5° C. The upper limit of the temperature of the precipitation bath depends on the concentration c of component (1) in the precipitation bath. The upper limit of the temperature is also referred to as the critical temperature $T_c$. The unit of $T_c$ is [° C.].

The critical temperature $T_c$ in [° C.] can be determined by the numerical equation $$T_c = (77-c)/0.58.$$

c therein is the concentration of component (1) in the precipitation bath in [% by weight]. c thus indicates the actual concentration of component (1) in the precipitation bath. Proceeding from the actual concentration of component (1) in the precipitation bath, it is possible to calculate the critical temperature $T_c$ in [° C.]. The percentages by weight are based on the sum of components (1) and (2) in the precipitation bath.

Within the inventive temperature range from 0° C. to $T_c$, preferably from 5° C. to $T_c$, the formation of fines and the agglomeration of the polyarylene ether beads is very substantially prevented.

In one embodiment of the invention, the precipitation bath is agitated. More particularly, the precipitation bath can be stirred. The division step can also be conducted into a flowing precipitation bath.

In one embodiment, the division step takes place in a closed precipitation bath, the application for individualization being mounted above the precipitation solution in or on the closed vessel.

In a process for producing polyarylene ether beads, the polyarylene ether solution may cover a distance from the exit point to precipitation bath surface of 0.10 m to 1.20 m. For example, the polyarylene ether solution may cover a distance from the exit point to precipitation bath surface of 0.15 m to 1.00 m.

The present invention also provides a process for producing polyarylene ether beads from a polyarylene ether solution which comprises an aprotic solvent and has a concentration of 5 to 50% by weight of polyarylene ether in the aprotic solvent, where the percentages by weight are based on the sum of the percentages by weight of the polyarylene ether and the aprotic solvent, comprising the steps of
i) dividing the polyarylene ether solution into droplets, wherein the polyarylene ether solution has a temperature of 15 to 250° C.,
ii) transferring the droplets into a precipitation bath to form polyarylene ether beads in the precipitation bath which
(A) comprises at least one aprotic solvent (component (1)) and at least one protic solvent (component (2)),
(B) has a temperature of 0° C. to $T_c$, where the critical temperature $T_c$ in [° C.] can be determined by the numerical equation $T_c=(77-c)/0.58$ in which c is the concentration of component (1) in the precipitation bath in [% by weight] and
(C) has component (1) in concentrations of 5 to 50% by weight, where
the percentages by weight are each based on the sum of the percentages by weight of component (1) and of component (2) in the precipitation bath.

The present invention also provides a process for producing polyarylene ether beads from a polyarylene ether solution which comprises an aprotic solvent and has a concentration of 5 to 50% by weight of polyarylene ether in the aprotic solvent, where the percentages by weight are based on the sum of the percentages by weight of the polyarylene ether and the aprotic solvent, comprising the steps of
i) dividing the polyarylene ether solution into droplets, wherein the polyarylene ether solution has a temperature of 15 to 250° C.,
ii) transferring the droplets into a precipitation bath to form polyarylene ether beads in the precipitation bath which
(A) comprises at least one aprotic solvent (component (1)) and at least one protic solvent (component (2)),
(B) has a temperature of 0° C. to $T_c$, where the critical temperature $T_c$ in [° C.] can be determined by the numerical equation $T_c=(77-c)/0.58$ in which c is the concentration of component (1) in the precipitation bath in [% by weight] and
(C) has component (1) in concentrations of 5 to 50% by weight, where
the percentages by weight are each based on the sum of the percentages by weight of component (1) and of component (2) in the precipitation bath and wherein the precipitation bath comprises water and/or alcohol as component (2) and the aprotic solvent comprises N-methyl-2-pyrrolidone and/or N-ethyl-2-pyrrolidone.

In addition, the invention relates to polyarylene ether beads from the process for production of polyarylene ether beads. After the division step, the beads are present in the precipitation bath solution. The beads can be separated from the further constituents present in the precipitation bath by suitable means. For example, the beads can be removed by sieving.

In general, the beads have a residence time in the precipitation solution of 1 min to 2 days.

Examination of the beads using a Camsizer for image analysis shows that the beads can have a sphericity value (SPHT value) of 0.4 to 1.0, especially of 0.5 to 1.0. To determine the SPHT value, image analysis using a Camsizer can be carried out following extraction of the beads with hot water (95° C.) for 20 hours and subsequent drying of the beads under vacuum at 150° C. for two days.

The application also relates to the use of beads for production of polyarylene ether products. Polyarylene ether products are understood to mean products which have been subjected to extraction, drying and/or a shaping process. For instance, the application also relates to products from the process, which, after workup such as extraction and drying, are converted to a saleable form such as pellets, powders, granules, chips, grains or fibers.

EXAMPLES

Examples 1 to 171: Variation of Precipitation Bath Temperature and Precipitation Bath Composition Experiments 1 to 171 were conducted successively, each with two illustrative polyarylene ether solutions, with optimization of the precipitation behavior.

Solution 1: A solution comprising a polyarylene ether having elements of the structure I (formula II) was dissolved in NMP and the respective concentration was set (see tables, polyarylene ether solution). The polyarylene ether used, having elements of the structure I, had a viscosity number of 56 ml/g. The viscosity number determination was conducted to ISO1628 from a 0.01 g/ml solution in phenol/1,2-dichlorobenzene (1:1) at 25° C.

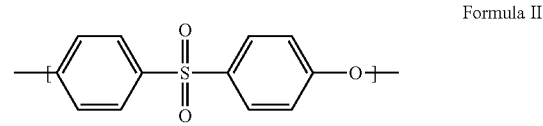

Formula II

Solution 2: A solution comprising a polyarylene ether having elements of the structure I (formula II) was dissolved in NEP and the respective concentration was set (see tables, polyarylene ether solution). The polyarylene ether used, having elements of the structure I, had a viscosity number of 56 ml/g. The viscosity number determination was conducted to ISO1628 from a 0.01 g/ml solution in phenol/1,2-dichlorobenzene (1:1) at 25° C.

Solution 3: A solution comprising a polyarylene ether having elements of the structure II (formula III) was dissolved in NMP and the respective concentration was set (see tables, polyarylene ether solution). The polyarylene ether used, having elements of the structure II, had a viscosity number of 63 ml/g. The viscosity number determination was conducted to ISO1628 from a 0.01 g/ml solution in phenol/ 1,2-dichlorobenzene (1:1) at 25° C.

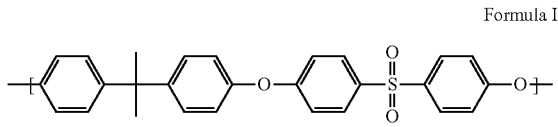

Formula III

Solution 4: A solution comprising a polyarylene ether having elements of the structure 11 (formula III) was dissolved in NEP and the respective concentration was set (see tables, polyarylene ether solution). The polyarylene ether used, having elements of the structure II, had a viscosity number of 63 ml/g.

The viscosity number determination was conducted to ISO1628 from a 0.01 g/ml solution in phenol/1,2-dichlorobenzene (1:1) at 25° C.

Solution 1 or the solutions 2, 3 or 4, each of set concentration, was run from a reservoir vessel at a constant delivery rate of 600 g/h through a capillary for division to form droplets. The experiments were conducted with a capillary as the die. The capillary diameter and the fall distance from exit from the capillary and precipitation bath surface were varied, as specified in the tables below.

After the division, the droplet of the respective polymer solution fell into a precipitation bath. The precipitation bath composition (NMP as component (1).1 or NEP as component (1).2 and water as component (2).1) was varied as specified in the tables. The temperature of the precipitation bath was kept constant during an experiment. The beads formed in the process were separated off using a screen and examined further.

The experiment was conducted at different precipitation bath temperatures.

In the experiments with solutions 1 and 3, the NMP content in the precipitation bath was controlled with the aid of a refractometer at 25° C. The instrument used was an Abbe refractometer from Leo Kübler GmbH (model: Atago). A drop of the water/NMP mixture was taken from the precipitation medium to measure the refractive index. Using a calibration curve of NMP/water composition versus refractive index, it was possible to control or measure the precipitation bath composition.

The same method for determining the NEP content was used in the experiments with solutions 2 and 4. For this purpose, a calibration curve of NEP/water composition versus refractive index was produced.

NMP Solvent, Solution 1

Variation of the NMP content of the precipitation bath at precipitation bath temperature 10° C.:

| | | Polyarylene ether solution | | | Precipitation | Precipitation bath | | |
|---|---|---|---|---|---|---|---|---|
| Ex. | Solution number | Conc. [% by wt.] | T [° C.] | Die diameter [mm] | height [cm] | T [° C.] | NMP content [% by wt.] | Precipitation characteristics |
| 1 | 1 | 14.2 | 25 | 0.8 | 20 | 10 | 20 | Individual beads |
| 2 | 1 | 14.2 | 25 | 0.8 | 20 | 10 | 30 | Individual beads |
| 3 | 1 | 14.2 | 25 | 0.8 | 20 | 10 | 40 | Individual beads |
| 4 | 1 | 14.2 | 25 | 0.8 | 20 | 10 | 50 | Individual beads |
| 5 | 1 | 14.2 | 25 | 0.8 | 20 | 10 | 65 | Individual beads |
| 6 | 1 | 14.2 | 25 | 0.8 | 20 | 10 | 72 | Beads which agglomerate in the precipitation bath |

Variation of the NMP content of the precipitation bath at precipitation bath temperature 20° C.:

| | | Polyarylene ether solution | | | Precipitation | Precipitation bath | | |
|---|---|---|---|---|---|---|---|---|
| Ex. | Solution number | Conc. [% by wt.] | T [° C.] | Die diameter [mm] | height [cm] | T [° C.] | NMP content [% by wt.] | Precipitation characteristics |
| 7 | 1 | 14.2 | 25 | 0.8 | 20 | 20 | 20 | Individual beads |
| 8 | 1 | 14.2 | 25 | 0.8 | 20 | 20 | 30 | Individual beads |
| 9 | 1 | 14.2 | 25 | 0.8 | 20 | 20 | 40 | Individual beads |
| 10 | 1 | 14.2 | 25 | 0.8 | 20 | 20 | 50 | Individual beads |
| 11 | 1 | 14.2 | 25 | 0.8 | 20 | 20 | 60 | Individual beads |
| 12 | 1 | 14.2 | 25 | 0.8 | 20 | 20 | 66 | Beads which agglomerate in the precipitation bath |

Variation of the NMP content of the precipitation bath at precipitation bath temperature 30° C.:

|  | Polyarylene ether solution | | | Precipitation height [cm] | Precipitation bath | | Precipitation characteristics |
|---|---|---|---|---|---|---|---|
| Ex. | Solution number | Conc. [% by wt.] | T [° C.] | Die diameter [mm] | | T [° C.] | NMP content [% by wt.] | |
| 13 | 1 | 14.2 | 25 | 0.8 | 20 | 30 | 20 | Individual beads |
| 14 | 1 | 14.2 | 25 | 0.8 | 20 | 30 | 30 | Individual beads |
| 15 | 1 | 14.2 | 25 | 0.8 | 20 | 30 | 40 | Individual beads |
| 16 | 1 | 14.2 | 25 | 0.8 | 20 | 30 | 50 | Individual beads |
| 17 | 1 | 14.2 | 25 | 0.8 | 20 | 30 | 55 | Individual beads |
| 18 | 1 | 14.2 | 25 | 0.8 | 20 | 30 | 60 | Beads which agglomerate in the precipitation bath |

Variation of the NMP content of the precipitation bath at precipitation bath temperature 40° C.:

| Ex. | Polyarylene ether solution | | | Precipitation height [cm] | Precipitation bath | | Precipitation characteristics |
|---|---|---|---|---|---|---|---|
| | Solution number | Conc. [% by wt.] | T [° C.] | Die diameter [mm] | | T [° C.] | NMP content [% by wt.] | |
| 19 | 1 | 14.2 | 25 | 0.8 | 20 | 40 | 20 | Individual beads |
| 20 | 1 | 14.2 | 25 | 0.8 | 20 | 40 | 30 | Individual beads |
| 21 | 1 | 14.2 | 25 | 0.8 | 20 | 40 | 40 | Individual beads |
| 22 | 1 | 14.2 | 25 | 0.8 | 20 | 40 | 50 | Individual beads |
| 23 | 1 | 14.2 | 25 | 0.8 | 20 | 40 | 55 | Beads which agglomerate in the precipitation bath |

Variation of the NMP content of the precipitation bath at precipitation bath temperature 50° C.:

| Ex. | Polyarylene ether solution | | | Precipitation height [cm] | Precipitation bath | | Precipitation characteristics |
|---|---|---|---|---|---|---|---|
| | Solution number | Conc. [% by wt.] | T [° C.] | Die diameter [mm] | | T [° C.] | NMP content [% by wt.] | |
| 24 | 1 | 14.2 | 25 | 0.8 | 20 | 50 | 20 | Individual beads |
| 25 | 1 | 14.2 | 25 | 0.8 | 20 | 50 | 30 | Individual beads |
| 26 | 1 | 14.2 | 25 | 0.8 | 20 | 50 | 40 | Individual beads |
| 27 | 1 | 14.2 | 25 | 0.8 | 20 | 50 | 45 | Individual beads |
| 28 | 1 | 14.2 | 25 | 0.8 | 20 | 50 | 49 | Beads which agglomerate in the precipitation bath |

Variation of the NMP content of the precipitation bath at precipitation bath temperature 60° C.:

| Ex. | Polyarylene ether solution | | | Precipitation height [cm] | Precipitation bath | | Precipitation characteristics |
|---|---|---|---|---|---|---|---|
| | Solution number | Conc. [% by wt.] | T [° C.] | Die diameter [mm] | | T [° C.] | NMP content [% by wt.] | |
| 29 | 1 | 14.2 | 25 | 0.8 | 20 | 60 | 20 | Individual beads |
| 30 | 1 | 14.2 | 25 | 0.8 | 20 | 60 | 30 | Individual beads |
| 31 | 1 | 14.2 | 25 | 0.8 | 20 | 60 | 35 | Individual beads |
| 32 | 1 | 14.2 | 25 | 0.8 | 20 | 60 | 40 | Individual beads |

-continued

|     | Polyarylene ether solution | | | Precipitation height [cm] | Precipitation bath | | Precipitation characteristics |
|---|---|---|---|---|---|---|---|
| Ex. | Solution number | Conc. [% by wt.] | T [° C.] | Die diameter [mm] | | T [° C.] | NMP content [% by wt.] | |
| 33 | 1 | 14.2 | 25 | 0.8 | 20 | 60 | 43 | Beads which agglomerate in the precipitation bath |

Variation of the NMP content of the precipitation bath at precipitation bath temperature 70° C.:

|     | Polyarylene ether solution | | | | Precipitation | Precipitation bath | | Precipitation characteristics |
|---|---|---|---|---|---|---|---|---|
| Ex. | Solution number | Conc. [% by wt.] | T [° C.] | Die diameter [mm] | height [cm] | T [° C.] | NMP content [% by wt.] | |
| 34 | 1 | 14.2 | 25 | 0.8 | 20 | 70 | 20 | Individual beads |
| 35 | 1 | 14.2 | 25 | 0.8 | 20 | 70 | 30 | Individual beads |
| 36 | 1 | 14.2 | 25 | 0.8 | 20 | 70 | 33 | Individual beads |
| 37 | 1 | 14.2 | 25 | 0.8 | 20 | 70 | 38 | Beads which agglomerate in the precipitation bath |

Variation of the NMP content of the precipitation bath at precipitation bath temperature 85° C.:

|     | Polyarylene ether solution | | | | Precipitation | Precipitation bath | | Precipitation characteristics |
|---|---|---|---|---|---|---|---|---|
| Ex. | Solution number | Conc. [% by wt.] | T [° C.] | Die diameter [mm] | height [cm] | T [° C.] | NMP content [% by wt.] | |
| 38 | 1 | 25 | 25 | 1.5 | 70 | 85 | 20 | Individual beads |
| 39 | 1 | 25 | 25 | 1.5 | 70 | 85 | 25 | Individual beads |
| 40 | 1 | 25 | 25 | 1.5 | 70 | 85 | 30 | Beads which agglomerate in the precipitation bath |

The NMP content in the precipitation bath was increased from 20% by weight until the beads present in the precipitation bath agglomerated. Agglomeration of the beads is disadvantageous since such beads cannot be processed any further.

NEP Solvent, Solution 2

Variation of the NEP content of the precipitation bath at precipitation bath temperature 10° C.:

|     | Polyarylene ether solution | | | | Precipitation | Precipitation bath | | Precipitation characteristics |
|---|---|---|---|---|---|---|---|---|
| Ex. | Solution number | Conc. [% by wt.] | T [° C.] | Die diameter [mm] | height [cm] | T [° C.] | NEP content [% by wt.] | |
| 41 | 2 | 16 | 25 | 0.8 | 40 | 10 | 20 | Individual beads |
| 42 | 2 | 16 | 25 | 0.8 | 40 | 10 | 30 | Individual beads |
| 43 | 2 | 16 | 25 | 0.8 | 40 | 10 | 40 | Individual beads |
| 44 | 2 | 16 | 25 | 0.8 | 40 | 10 | 50 | Individual beads |
| 45 | 2 | 16 | 25 | 0.8 | 40 | 10 | 65 | Individual beads |
| 46 | 2 | 16 | 25 | 0.8 | 40 | 10 | 72 | Beads which agglomerate in the precipitation bath |

Variation of the NEP content of the precipitation bath at precipitation bath temperature 20° C.:

| | Polyarylene ether solution | | | Precipitation height [cm] | Precipitation bath | | Precipitation characteristics |
|---|---|---|---|---|---|---|---|
| Ex. | Solution number | Conc. [% by wt.] | T [° C.] | Die diameter [mm] | | T [° C.] | NEP content [% by wt.] | |

| Ex. | Solution number | Conc. [% by wt.] | T [° C.] | Die diameter [mm] | height [cm] | T [° C.] | content [% by wt.] | Precipitation characteristics |
|---|---|---|---|---|---|---|---|---|
| 47 | 2 | 16 | 25 | 0.8 | 40 | 20 | 20 | Individual beads |
| 48 | 2 | 16 | 25 | 0.8 | 40 | 20 | 30 | Individual beads |
| 49 | 2 | 16 | 25 | 0.8 | 40 | 20 | 40 | Individual beads |
| 50 | 2 | 16 | 25 | 0.8 | 40 | 20 | 50 | Individual beads |
| 51 | 2 | 16 | 25 | 0.8 | 40 | 20 | 60 | Individual beads |
| 52 | 2 | 16 | 25 | 0.8 | 40 | 20 | 66 | Beads which agglomerate in the precipitation bath |

Variation of the NEP content of the precipitation bath at precipitation bath temperature 35° C.:

| Ex. | Solution number | Conc. [% by wt.] | T [° C.] | Die diameter [mm] | height [cm] | T [° C.] | content [% by wt.] | Precipitation characteristics |
|---|---|---|---|---|---|---|---|---|
| 53 | 2 | 16 | 25 | 0.8 | 40 | 35 | 20 | Individual beads |
| 54 | 2 | 16 | 25 | 0.8 | 40 | 35 | 30 | Individual beads |
| 55 | 2 | 16 | 25 | 0.8 | 40 | 35 | 40 | Individual beads |
| 56 | 2 | 16 | 25 | 0.8 | 40 | 35 | 50 | Individual beads |
| 57 | 2 | 16 | 25 | 0.8 | 40 | 35 | 55 | Individual beads |
| 58 | 2 | 16 | 25 | 0.8 | 40 | 35 | 58 | Beads which agglomerate in the precipitation bath |

Variation of the NEP content of the precipitation bath at precipitation bath temperature 50° C.:

| Ex. | Solution number | Conc. [% by wt.] | T [° C.] | Die diameter [mm] | height [cm] | T [° C.] | content [% by wt.] | Precipitation characteristics |
|---|---|---|---|---|---|---|---|---|
| 59 | 2 | 16 | 25 | 0.8 | 40 | 40 | 20 | Individual beads |
| 60 | 2 | 16 | 25 | 0.8 | 40 | 40 | 30 | Individual beads |
| 61 | 2 | 16 | 25 | 0.8 | 40 | 40 | 40 | Individual beads |
| 62 | 2 | 16 | 25 | 0.8 | 40 | 40 | 45 | Individual beads |
| 63 | 2 | 16 | 25 | 0.8 | 40 | 40 | 50 | Beads which agglomerate in the precipitation bath |

Variation of the NEP content of the precipitation bath at precipitation bath temperature 60° C.:

| Ex. | Solution number | Conc. [% by wt.] | T [° C.] | Die diameter [mm] | height [cm] | T [° C.] | content [% by wt.] | Precipitation characteristics |
|---|---|---|---|---|---|---|---|---|
| 64 | 2 | 16 | 25 | 0.8 | 40 | 60 | 20 | Individual beads |
| 65 | 2 | 16 | 25 | 0.8 | 40 | 60 | 30 | Individual beads |
| 66 | 2 | 16 | 25 | 0.8 | 40 | 60 | 35 | Individual beads |
| 67 | 2 | 16 | 25 | 0.8 | 40 | 60 | 40 | Individual beads |

-continued

| | Polyarylene ether solution | | | Precipitation | Precipitation bath | | |
|---|---|---|---|---|---|---|---|
| | | | | | | NEP | |
| Ex. | Solution number | Conc. [% by wt.] | T [° C.] | Die diameter [mm] | height [cm] | T [° C.] | content [% by wt.] | Precipitation characteristics |
| 68 | 2 | 16 | 25 | 0.8 | 40 | 60 | 43 | Beads which agglomerate in the precipitation bath |

Variation of the NEP content of the precipitation bath at precipitation bath temperature 70° C.:

| | Polyarylene ether solution | | | | Precipitation | Precipitation bath | | |
|---|---|---|---|---|---|---|---|---|
| | | | | | | | NEP | |
| Ex. | Solution number | Conc. [% by wt.] | T [° C.] | Die diameter [mm] | height [cm] | T [° C.] | content [% by wt.] | Precipitation characteristics |
| 69 | 2 | 16 | 25 | 0.8 | 40 | 70 | 20 | Individual beads |
| 70 | 2 | 16 | 25 | 0.8 | 40 | 70 | 30 | Individual beads |
| 71 | 2 | 16 | 25 | 0.8 | 40 | 70 | 33 | Individual beads |
| 72 | 2 | 16 | 25 | 0.8 | 40 | 70 | 38 | Beads which agglomerate in the precipitation bath |

The NEP content in the precipitation bath was increased from 20% by weight until the beads present in the precipitation bath agglomerated. Agglomeration of the beads is disadvantageous since such beads cannot be processed any further.

Variation of the precipitation bath temperature at NMP content 30% in the precipitation bath:

| | Polyarylene ether solution | | | | Precipitation | Precipitation bath | | |
|---|---|---|---|---|---|---|---|---|
| | | | | | | | NMP | |
| Ex. | Solution number | Conc. [% by wt.] | T [° C.] | Die diameter [mm] | height [cm] | T [° C.] | content [% by wt.] | Precipitation characteristics |
| 73 | 1 | 20 | 25 | 1 | 20 | 60 | 30 | Individual beads |
| 74 | 1 | 20 | 25 | 1 | 20 | 70 | 30 | Individual beads |
| 75 | 1 | 20 | 25 | 1 | 20 | 80 | 30 | Individual beads |
| 76 | 1 | 20 | 25 | 1 | 20 | 86 | 30 | Beads which agglomerate in the precipitation bath |
| 77 | 1 | 25 | 25 | 1.5 | 70 | 60 | 30 | Individual beads |
| 78 | 1 | 25 | 25 | 1.5 | 70 | 70 | 30 | Individual beads |
| 79 | 1 | 25 | 25 | 1.5 | 70 | 80 | 30 | Individual beads |
| 80 | 1 | 25 | 25 | 1.5 | 70 | 86 | 30 | Beads which agglomerate in the precipitation bath |
| 81 | 1 | 25 | 90 | 1.5 | 70 | 60 | 30 | Individual beads |
| 82 | 1 | 25 | 90 | 1.5 | 70 | 70 | 30 | Individual beads |
| 83 | 1 | 25 | 90 | 1.5 | 70 | 80 | 30 | Individual beads |
| 84 | 1 | 25 | 90 | 1.5 | 70 | 86 | 30 | Beads which agglomerate in the precipitation bath |

NMP Solvent, Solution 3

Variation of the NMP content of the precipitation bath at precipitation bath temperature 10° C.:

| | Polyarylene ether solution | | | Precipitation height [cm] | Precipitation bath | | Precipitation characteristics |
|---|---|---|---|---|---|---|---|
| Ex. | Solution number | Conc. [% by wt.] | T [° C.] | Die diameter [mm] | | T [° C.] | NMP content [% by wt.] | |
| 85 | 3 | 15 | 25 | 0.8 | 30 | 10 | 20 | Individual beads |
| 86 | 3 | 15 | 25 | 0.8 | 30 | 10 | 30 | Individual beads |
| 87 | 3 | 15 | 25 | 0.8 | 30 | 10 | 40 | Individual beads |
| 88 | 3 | 15 | 25 | 0.8 | 30 | 10 | 50 | Individual beads |
| 89 | 3 | 15 | 25 | 0.8 | 30 | 10 | 65 | Individual beads |
| 90 | 3 | 15 | 25 | 0.8 | 30 | 10 | 72 | Beads which agglomerate in the precipitation bath |

Variation of the NMP content of the precipitation bath at precipitation bath temperature 20° C.:

| Ex. | Solution number | Conc. [% by wt.] | T [° C.] | Die diameter [mm] | Precipitation height [cm] | T [° C.] | NMP content [% by wt.] | Precipitation characteristics |
|---|---|---|---|---|---|---|---|---|
| 91 | 3 | 15 | 25 | 0.8 | 30 | 20 | 20 | Individual beads |
| 92 | 3 | 15 | 25 | 0.8 | 30 | 20 | 30 | Individual beads |
| 93 | 3 | 15 | 25 | 0.8 | 30 | 20 | 40 | Individual beads |
| 94 | 3 | 15 | 25 | 0.8 | 30 | 20 | 50 | Individual beads |
| 95 | 3 | 15 | 25 | 0.8 | 30 | 20 | 60 | Individual beads |
| 96 | 3 | 15 | 25 | 0.8 | 30 | 20 | 66 | Beads which agglomerate in the precipitation bath |

Variation of the NMP content of the precipitation bath at precipitation bath temperature 30° C.:

| Ex. | Solution number | Conc. [% by wt.] | T [° C.] | Die diameter [mm] | Precipitation height [cm] | T [° C.] | NMP content [% by wt.] | Precipitation characteristics |
|---|---|---|---|---|---|---|---|---|
| 97 | 3 | 15 | 25 | 0.8 | 30 | 30 | 20 | Individual beads |
| 98 | 3 | 15 | 25 | 0.8 | 30 | 30 | 30 | Individual beads |
| 99 | 3 | 15 | 25 | 0.8 | 30 | 30 | 40 | Individual beads |
| 100 | 3 | 15 | 25 | 0.8 | 30 | 30 | 50 | Individual beads |
| 101 | 3 | 15 | 25 | 0.8 | 30 | 30 | 55 | Individual beads |
| 102 | 3 | 15 | 25 | 0.8 | 30 | 30 | 60 | Beads which agglomerate in the precipitation bath |

Variation of the NMP content of the precipitation bath at precipitation bath temperature 40° C.:

| Ex. | Solution number | Conc. [% by wt.] | T [° C.] | Die diameter [mm] | Precipitation height [cm] | T [° C.] | NMP content [% by wt.] | Precipitation characteristics |
|---|---|---|---|---|---|---|---|---|
| 103 | 3 | 15 | 25 | 0.8 | 30 | 40 | 20 | Individual beads |
| 104 | 3 | 15 | 25 | 0.8 | 30 | 40 | 30 | Individual beads |

-continued

|  | Polyarylene ether solution | | | Precipitation height [cm] | Precipitation bath | | Precipitation characteristics |
|---|---|---|---|---|---|---|---|
| Ex. | Solution number | Conc. [% by wt.] | T [° C.] | Die diameter [mm] | | T [° C.] | NMP content [% by wt.] |
| 105 | 3 | 15 | 25 | 0.8 | 30 | 40 | 40 | Individual beads |
| 106 | 3 | 15 | 25 | 0.8 | 30 | 40 | 50 | Individual beads |
| 107 | 3 | 15 | 25 | 0.8 | 30 | 40 | 55 | Beads which agglomerate in the precipitation bath |

Variation of the NMP content of the precipitation bath at precipitation bath temperature 50° C.:

| Ex. | Solution number | Conc. [% by wt.] | T [° C.] | Die diameter [mm] | Precipitation height [cm] | T [° C.] | NMP content [% by wt.] | Precipitation characteristics |
|---|---|---|---|---|---|---|---|---|
| 108 | 3 | 15 | 25 | 0.8 | 30 | 50 | 20 | Individual beads |
| 109 | 3 | 15 | 25 | 0.8 | 30 | 50 | 30 | Individual beads |
| 110 | 3 | 15 | 25 | 0.8 | 30 | 50 | 40 | Individual beads |
| 111 | 3 | 15 | 25 | 0.8 | 30 | 50 | 45 | Individual beads |
| 112 | 3 | 15 | 25 | 0.8 | 30 | 50 | 49 | Beads which agglomerate in the precipitation bath |

Variation of the NMP content of the precipitation bath at precipitation bath temperature 60° C.:

| Ex. | Solution number | Conc. [% by wt.] | T [° C.] | Die diameter [mm] | Precipitation height [cm] | T [° C.] | NMP content [% by wt.] | Precipitation characteristics |
|---|---|---|---|---|---|---|---|---|
| 113 | 3 | 15 | 25 | 0.8 | 30 | 60 | 20 | Individual beads |
| 114 | 3 | 15 | 25 | 0.8 | 30 | 60 | 30 | Individual beads |
| 115 | 3 | 15 | 25 | 0.8 | 30 | 60 | 35 | Individual beads |
| 116 | 3 | 15 | 25 | 0.8 | 30 | 60 | 40 | Individual beads |
| 117 | 3 | 15 | 25 | 0.8 | 30 | 60 | 43 | Beads which agglomerate in the precipitation bath |

Variation of the NMP content of the precipitation bath at precipitation bath temperature 70° C.:

| Ex. | Solution number | Conc. [% by wt.] | T [° C.] | Die diameter [mm] | Precipitation height [cm] | T [° C.] | NMP content [% by wt.] | Precipitation characteristics |
|---|---|---|---|---|---|---|---|---|
| 118 | 3 | 15 | 25 | 0.8 | 30 | 70 | 20 | Individual beads |
| 119 | 3 | 15 | 25 | 0.8 | 30 | 70 | 30 | Individual beads |
| 120 | 3 | 15 | 25 | 0.8 | 30 | 70 | 33 | Individual beads |
| 121 | 3 | 15 | 25 | 0.8 | 30 | 70 | 38 | Beads which agglomerate in the precipitation bath |

The NMP content in the precipitation bath was increased from 20% by weight until the beads present in the precipitation bath agglomerated. Agglomeration of the beads is disadvantageous since such beads cannot be processed any further.

NEP Solvent, Solution 4

Variation of the NEP content of the precipitation bath at precipitation bath temperature 10° C.:

| Ex. | Polyarylene ether solution | | | | Precipitation height [cm] | Precipitation bath | | Precipitation characteristics |
|---|---|---|---|---|---|---|---|---|
| | Solution number | Conc. [% by wt.] | T [° C.] | Die diameter [mm] | | T [° C.] | NEP content [% by wt.] | |
| 122 | 4 | 15 | 25 | 0.8 | 20 | 10 | 20 | Individual beads |
| 123 | 4 | 15 | 25 | 0.8 | 20 | 10 | 30 | Individual beads |
| 124 | 4 | 15 | 25 | 0.8 | 20 | 10 | 40 | Individual beads |
| 125 | 4 | 15 | 25 | 0.8 | 20 | 10 | 50 | Individual beads |
| 126 | 4 | 15 | 25 | 0.8 | 20 | 10 | 65 | Individual beads |
| 127 | 4 | 15 | 25 | 0.8 | 20 | 10 | 72 | Beads which agglomerate in the precipitation bath |

Variation of the NEP content of the precipitation bath at precipitation bath temperature 20° C.:

| Ex. | Polyarylene ether solution | | | | Precipitation height [cm] | Precipitation bath | | Precipitation characteristics |
|---|---|---|---|---|---|---|---|---|
| | Solution number | Conc. [% by wt.] | T [° C.] | Die diameter [mm] | | T [° C.] | NEP content [% by wt.] | |
| 128 | 4 | 15 | 25 | 0.8 | 20 | 20 | 20 | Individual beads |
| 129 | 4 | 15 | 25 | 0.8 | 20 | 20 | 30 | Individual beads |
| 130 | 4 | 15 | 25 | 0.8 | 20 | 20 | 40 | Individual beads |
| 131 | 4 | 15 | 25 | 0.8 | 20 | 20 | 50 | Individual beads |
| 132 | 4 | 15 | 25 | 0.8 | 20 | 20 | 60 | Individual beads |
| 133 | 4 | 15 | 25 | 0.8 | 20 | 20 | 66 | Beads which agglomerate in the precipitation bath |

Variation of the NEP content of the precipitation bath at precipitation bath temperature 30° C.:

| Ex. | Polyarylene ether solution | | | | Precipitation height [cm] | Precipitation bath | | Precipitation characteristics |
|---|---|---|---|---|---|---|---|---|
| | Solution number | Conc. [% by wt.] | T [° C.] | Die diameter [mm] | | T [° C.] | NEP content [% by wt.] | |
| 134 | 4 | 15 | 25 | 0.8 | 20 | 30 | 20 | Individual beads |
| 135 | 4 | 15 | 25 | 0.8 | 20 | 30 | 30 | Individual beads |
| 136 | 4 | 15 | 25 | 0.8 | 20 | 30 | 40 | Individual beads |
| 137 | 4 | 15 | 25 | 0.8 | 20 | 30 | 50 | Individual beads |
| 138 | 4 | 15 | 25 | 0.8 | 20 | 30 | 55 | Individual beads |
| 139 | 4 | 15 | 25 | 0.8 | 20 | 30 | 60 | Beads which agglomerate in the precipitation bath |

Variation of the NEP content of the precipitation bath at precipitation bath temperature 40° C.:

| | Polyarylene ether solution | | | Precipitation height [cm] | Precipitation bath | | Precipitation characteristics |
|---|---|---|---|---|---|---|---|
| Ex. | Solution number | Conc. [% by wt.] | T [° C.] | Die diameter [mm] | | T [° C.] | NEP content [% by wt.] | |
| 140 | 4 | 15 | 25 | 0.8 | 20 | 40 | 20 | Individual beads |
| 141 | 4 | 15 | 25 | 0.8 | 20 | 40 | 30 | Individual beads |
| 142 | 4 | 15 | 25 | 0.8 | 20 | 40 | 40 | Individual beads |
| 143 | 4 | 15 | 25 | 0.8 | 20 | 40 | 50 | Individual beads |
| 144 | 4 | 15 | 25 | 0.8 | 20 | 40 | 55 | Beads which agglomerate in the precipitation bath |

Variation of the NEP content of the precipitation bath at precipitation bath temperature 50° C.:

| | Polyarylene ether solution | | | Precipitation height [cm] | Precipitation bath | | Precipitation characteristics |
|---|---|---|---|---|---|---|---|
| Ex. | Solution number | Conc. [% by wt.] | T [° C.] | Die diameter [mm] | | T [° C.] | NEP content [% by wt.] | |
| 145 | 4 | 15 | 25 | 0.8 | 20 | 50 | 20 | Individual beads |
| 146 | 4 | 15 | 25 | 0.8 | 20 | 50 | 30 | Individual beads |
| 147 | 4 | 15 | 25 | 0.8 | 20 | 50 | 40 | Individual beads |
| 148 | 4 | 15 | 25 | 0.8 | 20 | 50 | 45 | Individual beads |
| 149 | 4 | 15 | 25 | 0.8 | 20 | 50 | 49 | Beads which agglomerate in the precipitation bath |

Variation of the NEP content of the precipitation bath at precipitation bath temperature 60° C.:

| | Polyarylene ether solution | | | Precipitation height [cm] | Precipitation bath | | Precipitation characteristics |
|---|---|---|---|---|---|---|---|
| Ex. | Solution number | Conc. [% by wt.] | T [° C.] | Die diameter [mm] | | T [° C.] | NEP content [% by wt.] | |
| 150 | 4 | 15 | 25 | 0.8 | 20 | 60 | 20 | Individual beads |
| 151 | 4 | 15 | 25 | 0.8 | 20 | 60 | 30 | Individual beads |
| 152 | 4 | 15 | 25 | 0.8 | 20 | 60 | 35 | Individual beads |
| 153 | 4 | 15 | 25 | 0.8 | 20 | 60 | 40 | Individual beads |
| 154 | 4 | 15 | 25 | 0.8 | 20 | 60 | 43 | Beads which agglomerate in the precipitation bath |

Variation of the NEP content of the precipitation bath at precipitation bath temperature 70° C.:

| | Polyarylene ether solution | | | Precipitation height [cm] | Precipitation bath | | Precipitation characteristics |
|---|---|---|---|---|---|---|---|
| Ex. | Solution number | Conc. [% by wt.] | T [° C.] | Die diameter [mm] | | T [° C.] | NEP content [% by wt.] | |
| 155 | 4 | 15 | 25 | 0.8 | 20 | 70 | 20 | Individual beads |
| 156 | 4 | 15 | 25 | 0.8 | 20 | 70 | 30 | Individual beads |
| 157 | 4 | 15 | 25 | 0.8 | 20 | 70 | 33 | Individual beads |
| 158 | 4 | 15 | 25 | 0.8 | 20 | 70 | 38 | Beads which agglomerate in the precipitation bath |

The NEP content in the precipitation bath was increased from 20% by weight until the beads present in the precipitation bath agglomerated. Agglomeration of the beads is disadvantageous since such beads cannot be processed any further.

Variation of the precipitation bath temperature at NMP content 30% in the precipitation bath:

The conditions in the extraction with water were as follows:
Temp. in the extraction: 95° C.
Extractant throughput: 2000 ml water/h
Extractant temp.: 90-95° C.
Extraction period: 24 h

| | Polyarylene ether solution | | | Precipitation | Precipitation bath | | |
|---|---|---|---|---|---|---|---|
| Ex. | Solution number | Conc. [% by wt.] | T [° C.] | Die diameter [mm] | height [cm] | T [° C.] | NMP content [% by wt.] | Precipitation characteristics |
| 160 | 3 | 20 | 25 | 1 | 20 | 60 | 30 | Individual beads |
| 161 | 3 | 20 | 25 | 1 | 20 | 70 | 30 | Individual beads |
| 162 | 3 | 20 | 25 | 1 | 20 | 80 | 30 | Individual beads |
| 163 | 3 | 20 | 25 | 1 | 20 | 85 | 30 | Beads which agglomerate in the precipitation bath |
| 164 | 3 | 25 | 25 | 1 | 60 | 60 | 30 | Individual beads |
| 165 | 3 | 25 | 25 | 1 | 60 | 70 | 30 | Individual beads |
| 166 | 3 | 25 | 25 | 1 | 60 | 80 | 30 | Individual beads |
| 167 | 3 | 25 | 25 | 1 | 60 | 85 | 30 | Beads which agglomerate in the precipitation bath |
| 168 | 3 | 25 | 90 | 1 | 60 | 60 | 30 | Individual beads |
| 169 | 3 | 25 | 90 | 1 | 60 | 70 | 30 | Individual beads |
| 170 | 3 | 25 | 90 | 1 | 60 | 80 | 30 | Individual beads |
| 171 | 3 | 25 | 90 | 1 | 60 | 85 | 30 | Beads which agglomerate in the precipitation bath |

Examples 172 to 175 show the influence of the NMP concentration in the precipitation bath on the formation of fines. "Fines" are understood here to mean polyarylene ether beads having a particle size of ≤1000 μm.

For this purpose, a solution 5 of polyarylene ether in NMP was prepared. The polyarylene ether used was Ultrason® E2020 from BASF SE. The concentration of the polyarylene ether was 18.0% by weight.

The polyarylene ether was precipitated by means of dropletization and then extracted.

For the dropletization, solution 5 was introduced into the reservoir vessel and adjusted to the desired temperature. By means of a gear pump, solution 5 was dropletized through a capillary. The precipitation was effected in a precipitation bath with an overflow to an agitated screen which removed the beads. The precipitation bath solution was collected in a buffer vessel and then sent back to the precipitation bath.

The concentration of NMP in the precipitation bath was monitored by means of refractive index and balanced by addition of demineralized water. After dropletization had ended, the beads/lenses were filtered off with suction, washed with demineralized water and then extracted.

The conditions during the dropletization are specified in the following table.

The particle size distribution was determined as follows:

The extracted moist beads/lenses were dried in a drying cabinet at 60° C. and then the distribution was determined by means of manual screening in a screening tower. The results are reported in the table which follows.

| Particle size [μm] | 172 | 173 |
|---|---|---|
| 3150 | 100.0 | 99.80 |
| 2800 | 99.78 | 99.01 |
| 2500 | 98.49 | 97.43 |
| 2000 | 54.96 | 30.56 |
| 1600 | 8.62 | 5.84 |
| 1250 | 3.45 | 2.67 |
| 1000 | 1.08 | 1.68 |
| 650 | 0.22 | 0.69 |
| Sum ≤1000 = fines | 1.3 | 2.37 |

Examples 174 and 175 were conducted analogously to examples 172 and 173. The fall height and the temperature were altered; the concentration of the precipitation bath was varied. The results are reported in the table which follows.

| Exp. | Solvent | Conc. in solution 5 [% by wt.] | Conc. solv. in the precipitation bath [%] | Precipitation bath temp. [° C.] | Temp. of solution 5 on dropletization [° C.] | Fall height [cm] |
|---|---|---|---|---|---|---|
| 172 | NMP | 18.0 | 40 | 40 | 40 | 30 |
| 173 | NMP | 18.0 | <1 | 40 | 40 | 30 |

| | Precipitation bath | | PES soln. | | | Fines |
|---|---|---|---|---|---|---|
| Exp. | Conc. NMP [%] | Temp. [° C.] | SC [%] | Temp. [° C.] | Fall height [cm] | fraction <1 mm [%] |
| 174 | 20 | 35 | 23 | 65 | 90 | 0.37 |
| 175 | 1 | 35 | 23 | 65 | 90 | 0.93 |

Examples 172 to 175 show that, within the inventive concentration range of aprotic solvent in the precipitation bath, polyarylene ether beads having a distinctly smaller fines fraction are obtained.

The invention claimed is:

1. A process for producing polyarylene ether beads from a polyarylene ether solution, the process comprising:
   i) dividing the polyarylene ether solution into droplets; and
   ii) transferring the droplets into a precipitation bath to form polyarylene ether beads in the precipitation bath,
   wherein the precipitation bath
   (A) comprises at least one aprotic solvent (component (1)) and at least one protic solvent (component (2));
   (B) has a temperature of 0° C. to $T_c$, where the critical temperature $T_c$ in [° C.] can be determined by the numerical equation $T_c=(77-c)/0.58$ in which c is the concentration of component (1) in the precipitation bath in [% by weight] and
   (C) has component (1) in a concentration of 12 to 70% by weight, where the percentage by weight is based on the sum of the percentages by weight of component (1) and of component (2) in the precipitation bath,
   wherein the precipitation bath comprises water or alcohol as component (2),
   wherein the polyarylene ether solution has a concentration of 5 to 50% by weight of polyarylene ether in the aprotic solvent, where the percentage by weight are based on the sum of the percentages by weight of the polyarylene ether and the aprotic solvent,
   wherein the polyarylene ether solution in the dividing has a temperature of 15 to 250° C.,
   wherein the aprotic solvent is at least one selected from the group consisting of N-methyl-2-pyrrolidone and N-ethyl-2-pyrrolidone, and
   wherein, in the polyarylene ether beads precipitated from the precipitation bath in (ii), the content of particles having a particle size of less than or equal to 1000 μm is less than 1.3% by weight.

2. The process according to claim 1, wherein the precipitation bath is agitated.

3. The process according to claim 1, wherein the polyarylene ether solution in the dividing has a temperature of 20 to 120° C.

4. The process according to claim 1, wherein the polyarylene ether solution after leaving a division apparatus covers a full distance from an exit point to a precipitation bath surface of 0.10 m to 1.20 m.

5. The process according to claim 1, wherein a division apparatus comprises a capillary or die plate.

6. The process according to claim 5, wherein the capillary or die plate has a diameter of 0.1 to 5.0 mm.

7. The process according to claim 1, wherein the polyarylene ether solution and the precipitation bath comprise the same aprotic solvent.

8. The process according to claim 1, wherein the precipitation bath comprises 12 to 50% by weight, of component (1), where the percentages by weight are each based on the sum of the percentages by weight of component (1) and component (2) in the precipitation bath.

9. The process according to claim 1, further comprising stirring the precipitation bath when transferring the droplets into the precipitation bath.

10. The process according to claim 1, wherein the polyarylene ether beads are individual beads which are not agglomerated.

11. The process of claim 1, wherein, in the polyarylene ether beads precipitated from the precipitation bath in (ii), the content of particles having a particle size of less than or equal to 1000 μm is 0.93% by weight or less.

12. The process according to claim 1, wherein the polyarylene ether beads are individual beads which are not agglomerated.

13. A process for producing polyarylene ether beads of claim 1 from a polyarylene ether solution, the process comprising:
   i) dividing the polyarylene ether solution into droplets; and
   ii) transferring the droplets into a precipitation bath to form polyarylene ether beads in the precipitation bath,
   wherein the precipitation bath
   (A) comprises at least one aprotic solvent (component (1)) and at least one protic solvent (component (2));
   (B) has a temperature of 0° C. to $T_c$, where the critical temperature $T_c$ in [° C.] can be determined by the numerical equation $T_c=(77-c)/0.58$ in which c is the concentration of component (1) in the precipitation bath in [% by weight] and
   (C) has component (1) in a concentration of 12 to 70% by weight, where the percentage by weight is based on the sum of the percentages by weight of component (1) and of component (2) in the precipitation bath,
   wherein the precipitation bath comprises water or alcohol as component (2),
   wherein the polyarylene ether solution has a concentration of 5 to 50% by weight of polyarylene ether in the aprotic solvent, where the percentage by weight are based on the sum of the percentages by weight of the polyarylene ether and the aprotic solvent,
   wherein the polyarylene ether solution in the dividing has a temperature of 15 to 250° C.,
   wherein the aprotic solvent is at least one selected from the group consisting of N-methyl-2-pyrrolidone and N-ethyl-2-pyrrolidone, and
   wherein the polyarylene ether comprises at least one repeat structural unit selected from the group consisting of:

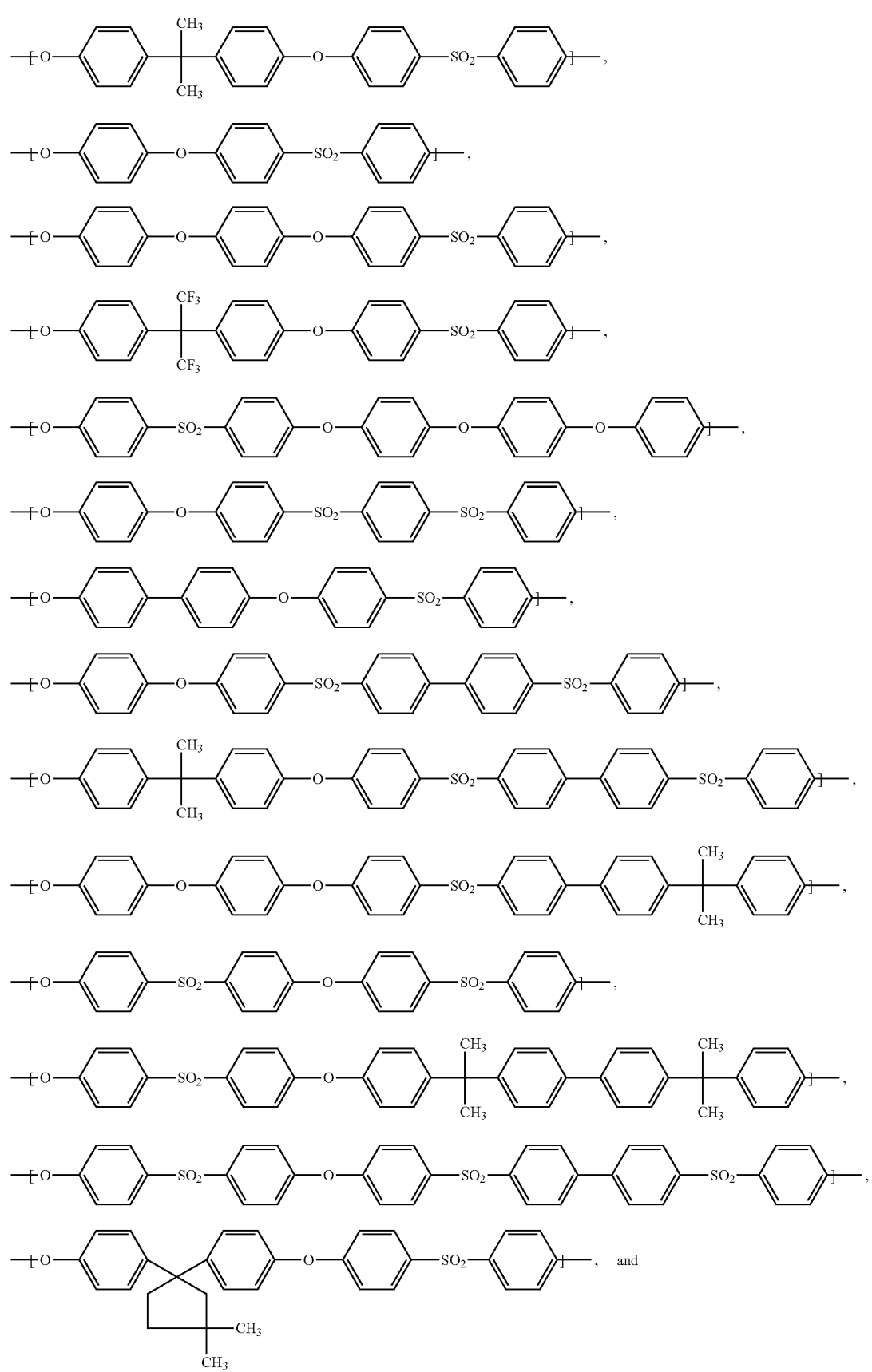

-continued
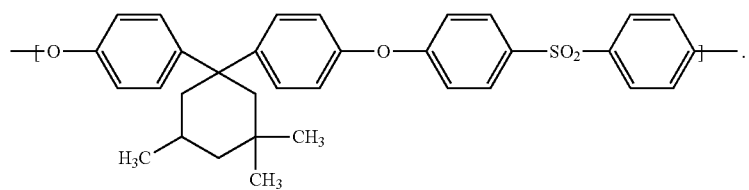
14. The process of claim 13, wherein the polyarylene ether comprises at least one repeat structural unit selected from the group consisting of:
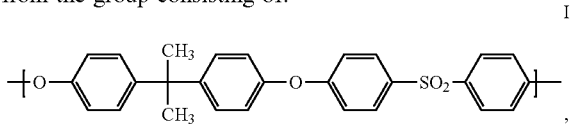
Ia
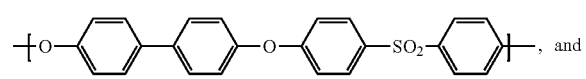
Ig
, and
-continued
Io
Ik
15. The process of claim 1, wherein the aprotic solvent is N-methyl-2-pyrrolidone.
* * * * *